United States Patent
Rindfleisch et al.

(10) Patent No.: US 9,573,583 B2
(45) Date of Patent: Feb. 21, 2017

(54) VEHICLE SPEED CONTROL

(71) Applicant: Deere & Company, Moline, IL (US)

(72) Inventors: David F. Rindfleisch, Dubuque, IA (US); Douglas T. Corbett, Dubuque, IA (US); Francois Stander, Dubuque, IA (US); Jeremy B. Shuler, Durango, IA (US)

(73) Assignee: Deere & Company, Moline, IL (US)

(*) Notice: Subject to any disclaimer, the term of this patent is extended or adjusted under 35 U.S.C. 154(b) by 0 days.

(21) Appl. No.: 14/191,583

(22) Filed: Feb. 27, 2014

(65) Prior Publication Data

US 2015/0239470 A1 Aug. 27, 2015

(51) Int. Cl.
| | |
|---|---|
| *B60W 10/196* | (2012.01) |
| *B60W 10/06* | (2006.01) |
| *B60W 30/14* | (2006.01) |
| *B60W 30/18* | (2012.01) |

(52) U.S. Cl.
CPC .......... *B60W 10/196* (2013.01); *B60W 10/06* (2013.01); *B60W 30/143* (2013.01); *B60W 30/146* (2013.01); *B60W 30/18109* (2013.01); *B60W 2540/103* (2013.01); *B60W 2710/0627* (2013.01); *B60W 2710/0666* (2013.01)

(58) Field of Classification Search
CPC .. B60W 30/146; B60W 10/06; B60W 10/196; B60W 30/143; B60W 30/18109; B60W 2540/103; B60W 2710/0627; B60W 2710/0666; B60T 8/18
USPC ............................ 701/110, 70; 123/320–323
See application file for complete search history.

(56) References Cited

U.S. PATENT DOCUMENTS

| | | | | |
|---|---|---|---|---|
| 4,050,556 | A * | 9/1977 | Forster .................... | B60T 1/087 192/216 |
| 5,647,318 | A * | 7/1997 | Feucht .................... | F01L 13/06 123/321 |
| 5,813,231 | A * | 9/1998 | Faletti ..................... | F01L 13/06 123/321 |
| 5,921,883 | A * | 7/1999 | Bellinger .............. | B60W 30/18 123/322 |
| 6,249,735 | B1 * | 6/2001 | Yamada et al. ................. | 701/65 |
| 6,652,414 | B1 * | 11/2003 | Banks, III .............. | F01L 13/06 123/323 |
| 6,819,995 | B2 * | 11/2004 | Bellinger .............. | B60W 10/06 477/124 |
| 7,102,313 | B2 * | 9/2006 | Kadota ................. | B60W 20/15 180/65.1 |
| 7,134,985 | B2 * | 11/2006 | Watanabe et al. ........... | 477/186 |
| 7,440,832 | B2 * | 10/2008 | Steen .................... | B60W 10/06 477/107 |
| 7,672,771 | B2 * | 3/2010 | Nakanishi et al. ............ | 701/70 |
| 7,869,927 | B2 * | 1/2011 | Uematsu ........................ | 701/70 |

(Continued)

FOREIGN PATENT DOCUMENTS

| | | |
|---|---|---|
| EP | 2644467 A1 | 10/2013 |
| WO | 2012079844 A1 | 6/2012 |

*Primary Examiner* — Mahmoud Gimie

(74) *Attorney, Agent, or Firm* — Lorenz & Kopf, LLP

(57) ABSTRACT

A method for controlling vehicle speed comprises sensing a position of an operator input, engaging a retarder upon the position falling below a first threshold, modifying a retarding force exerted by the retarder based on the position while the retarder is engaged and the position is below a second threshold, and disengaging the retarder upon the position rising above the second threshold.

20 Claims, 4 Drawing Sheets

(56) References Cited

U.S. PATENT DOCUMENTS

| | | | | |
|---|---|---|---|---|
| 8,306,716 B2* | 11/2012 | Burkhart et al. | ............... | 701/93 |
| 2002/0079173 A1* | 6/2002 | Suo | ........................... | B60L 7/28 |
| | | | | 188/158 |
| 2006/0266017 A1* | 11/2006 | Kresse | .................. | B60W 10/06 |
| | | | | 60/274 |
| 2008/0172162 A1* | 7/2008 | Wegeng | .................. | B60T 10/02 |
| | | | | 701/70 |
| 2008/0262693 A1* | 10/2008 | Burkhart et al. | ............... | 701/98 |
| 2009/0112391 A1* | 4/2009 | Uematsu | ................. | B60T 10/00 |
| | | | | 701/31.4 |
| 2010/0049400 A1* | 2/2010 | Duraiswamy | ....... | B60W 30/143 |
| | | | | 701/33.4 |
| 2010/0168976 A1* | 7/2010 | Andrasko | ....... | B60W 30/18136 |
| | | | | 701/70 |
| 2012/0209486 A1* | 8/2012 | Stander | .................. | B60T 10/00 |
| | | | | 701/70 |
| 2013/0047955 A1* | 2/2013 | Reedy | .................... | B60T 10/00 |
| | | | | 123/320 |
| 2013/0253794 A1* | 9/2013 | Hoefler et al. | .................. | 701/70 |

* cited by examiner

VEHICLE SPEED CONTROL

FIELD OF THE DISCLOSURE

The present invention generally relates to controlling vehicle speed, and more particularly to controlling a retarder.

BACKGROUND

Vehicle speed may be controlled through various mechanisms, including brakes and retarders. Brakes and retarders may be used to slow a vehicle or prevent acceleration, such as during descents. Retarders may be used instead of brakes to minimize the wear and localized heat caused by brake applications, particularly if a descent is long, steep, or undertaken while the vehicle is fully loaded.

In those applications where it is advantageous for a vehicle to use a retarder instead of brakes, it may be desirable to make the application of the retarder as easy and automatic as possible to encourage its usage where appropriate. It may also be desirable to reduce the number of cycles the retarder experiences to reduce the wear associated with cycling the retarder and any discontinuities in vehicle acceleration such cycling may cause.

SUMMARY

According to an aspect of the present disclosure, a method for controlling vehicle speed comprises sensing a position of an operator input, engaging a retarder upon the position falling below a first threshold, modifying a retarding force exerted by the retarder based on the position while the retarder is engaged and the position is below a second threshold, and disengaging the retarder upon the position rising above the second threshold.

The present disclosure may allow a retarder to be more easily and automatically applied and adjusted while also reducing the number of cycles the retarder experiences. This may encourage the usage of the retarder instead of brakes for vehicle speed control in those applications where it is appropriate, while increasing the life of the retarder and associated components.

The above and other features will become apparent from the following description and accompanying drawings.

BRIEF DESCRIPTION OF THE DRAWINGS

The detailed description of the drawings refers to the accompanying figures in which.

DETAILED DESCRIPTION

Figure 1:
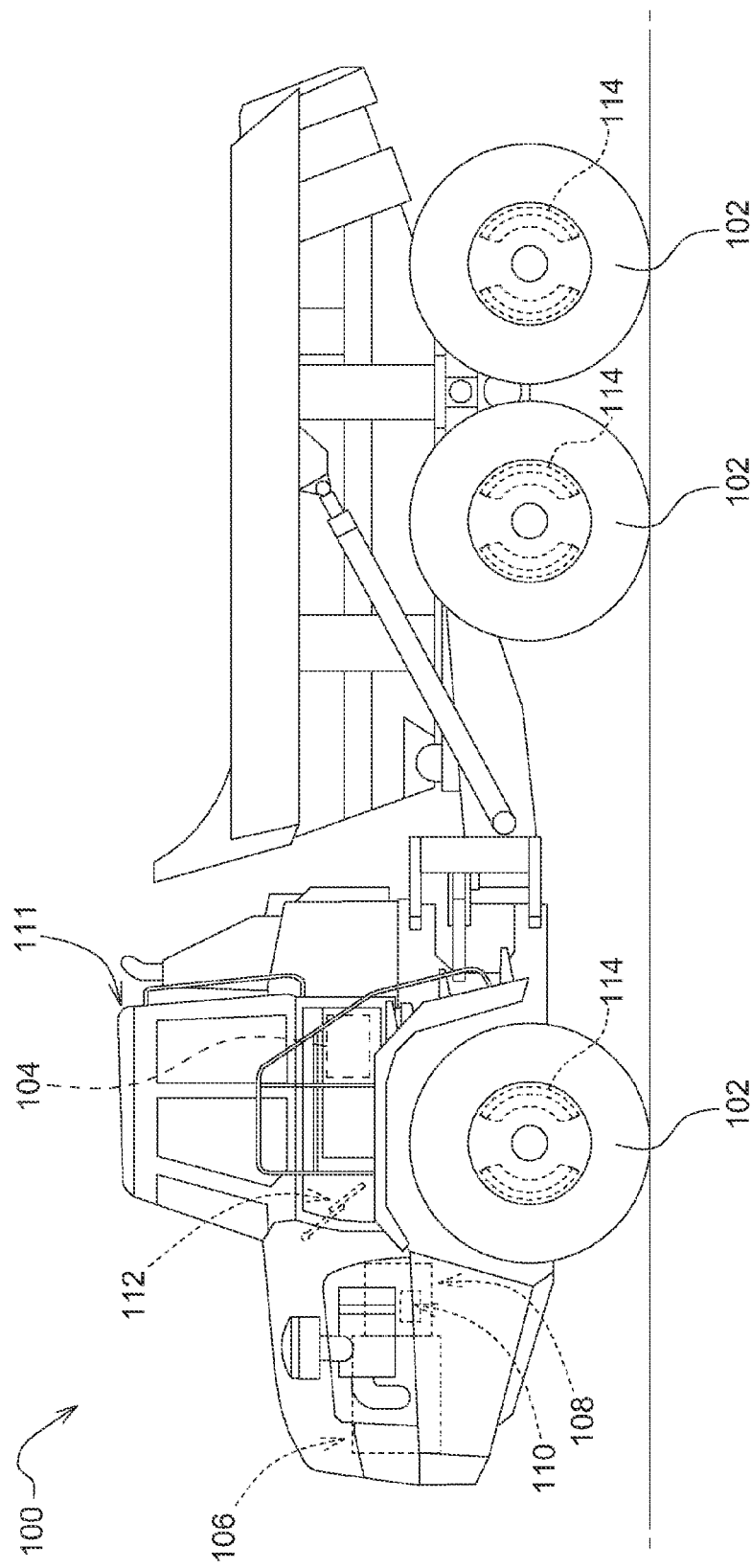
FIG. 1 is a left side elevation view of a vehicle, for example an articulated dump truck.

FIG. 1 illustrates vehicle 100, for example an articulated dump truck, comprising wheels 102, controller 104, engine 106 (e.g., a diesel engine), transmission 108, retarder 110, operator cab 111, accelerator pedal 112, and service brakes 114.

The vehicle may be any vehicle which includes a retarder, such as a construction, forestry, or mining vehicle. Vehicle 100 is illustrated as an articulated dump truck, but the vehicle may also be, for example, a backhoe loader, crawler, excavator, feller buncher, forwarder, harvester, knuckle-boom loader, motor grader, scraper, skidder, skid steer loader, track loader, or truck (such as a mining truck). Vehicle 100 engages the ground through six wheels 102, which support vehicle 100 on the ground, but alternative embodiments may include alternate ground engaging components such as tracks.

Controller 104 comprises a microprocessor operatively coupled with memory and input/output circuitry. Controller 104 is in electrical communication with engine 106, retarder 110, and accelerator pedal 112, among other components, such that it may receive signals from these components or send signals to these components. Each component may be directly operatively coupled to controller 104 (e.g., through a wiring harness or radio transceivers) or indirectly operatively coupled to controller 104 (e.g., through intermediate components such as other controllers), but in either event electrical signals may be communicated between controller 104 and the component. The intermediate components may pass electrical signals between controller 104 and the component without modification, or may process such signals. For example, controller 104 may send an electrical signal commanding engine 106 to 1,800 rotations per minute (RPM) through an intermediate engine controller which is operatively coupled to engine 106. The engine controller may sense the electrical signal from controller 104 and output electrical signals to certain solenoids or other controllers to achieve the 1,800 RPM command, or, based on its own programming, it may bring engine 106 to a different speed such as 1,600 RPM. Even if intermediate components possess such capabilities, controller 104 remains in electrical communication with the component.

Transmission 108 is a multi-speed mechanical transmission operatively coupled to engine 106 and operatively coupled to wheels 102 through intermediate drivetrain components such as a driveshaft, differential, axle, and final drive. Alternative embodiments may use different transmission types, including other types of multi-speed transmission (i.e., transmissions with a modifiable output speed to input speed ratio) such as hydraulic transmissions, continuously variable transmissions, and infinitely variable transmissions. Retarder 110 is a hydraulic retarder, and may also be referred to as a hydrodynamic retarder, which has been integrated into transmission 108 and thus may be called a transmission retarder. Alternative embodiments may use different retarder types, such as an engine brake retarder, exhaust brake retarder, or electric retarder (e.g., an eddy current retarder). When retarder 110 is disengaged, it does not provide hydraulic drag or retarding force except for minor effects such as windage losses. When retarder 110 is engaged, such as upon a command from controller 104 to engage, it provides hydraulic drag opposing the rotation of components in the drivetrain of vehicle 100. This hydraulic drag results in a retarding force which tends to slow vehicle 100, or a negative torque. The amount of hydraulic drag produced by retarder 110 may be varied, thereby allowing retarder 110 to achieve a variable retarding force.

Operator cab 111 provides a station for an operator to control vehicle 100, and includes accelerator pedal 112, a brake pedal, a steering wheel, and other operator inputs such as switches and buttons to activate and deactivate certain features. Accelerator pedal 112 is a movable-pedal type operator input which is commonly found on vehicles, including automobiles. Accelerator pedal 112 may occupy a range of positions, from a neutral non-depressed position to which it is spring-biased towards and will occupy absent an external force, to a fully depressed position it will occupy after being fully actuated by an external force such as an operator's foot. Such an operator input has a number of different names, and may be called an "accelerator pedal," "gas pedal," or "throttle pedal." In the embodiment depicted in FIG. 1, the position of accelerator pedal 112 (which may be an angular or a linear position) is used to determine the requested torque output from engine 106. In alternative embodiments, the position of accelerator pedal 112 may be mapped to other targets, such as torque of vehicle 100's powertrain, requested speed of engine 106, acceleration or speed of vehicle 100, or rimpull (i.e., the tractive force exerted by vehicle 100 through wheels 102). Collectively, these targets set by the position of accelerator pedal 112 may be referred to as a vehicle propel command, or a command regarding vehicle propulsion. In alternative embodiments, a vehicle propel command may be issued or modified by a controller or control system on vehicle 100, such as one configured to manage vehicle speed (e.g., cruise control, speed limiters), traction (e.g., limited slip traction control), or vehicle operation (e.g., global positioning system (GPS) guided autonomous or semi-autonomous operation). The position of accelerator pedal 112 may be sensed by any number of components, including a rotatory position sensor (e.g., Hall Effect potentiometer, optical encoder) or a linear position sensor (e.g., LVDT), and the sensor chosen may depend on the design of accelerator pedal 112 and any associated linkages and the available connection points for a sensor. In the embodiment depicted in FIG. 1, a rotary position sensor measures the position of the accelerator pedal 112. After the signal from the sensor has been processed, the output may range from 0%, which corresponds to accelerator pedal 112 in the neutral non-depressed position, to 100%, which corresponds to accelerator pedal 112 in the fully depressed position.

Service brakes 114 may be conventional friction brakes, such as disc (wet or dry) brakes integrated into an axle. While service brakes 114 may be utilized to slow or stop vehicle 100, such usage causes wear on a friction braking system and generates local heat at the brakes. Such wear may be undesirable as it may result in costs for servicing or replacing brake components. Generating local heat at service brakes 114 may be undesirable for multiple reasons. First, the heat generated by service brakes 114 must be rejected to the environment, which requires cooling components such as heatsinks or cooling circuits. Second, the heat generated by using service brakes 114 may cause brake fade and reduce the performance of service brakes 114. Using service brakes 114 on a routine basis, such as on a vehicle operating nearly continuously at a work site, or heavy usage of service brake 114 over a short period of time, such as slowing vehicle 100 when it is loaded and descending a hill, may cause significant wear and generate significant amounts of heat. Using a retarder in these applications may reduce service brake wear and better dissipate heat generated, and may allow for less complex or costly brake design, avoid brake maintenance, and avoid brake fade.

Figure 2:
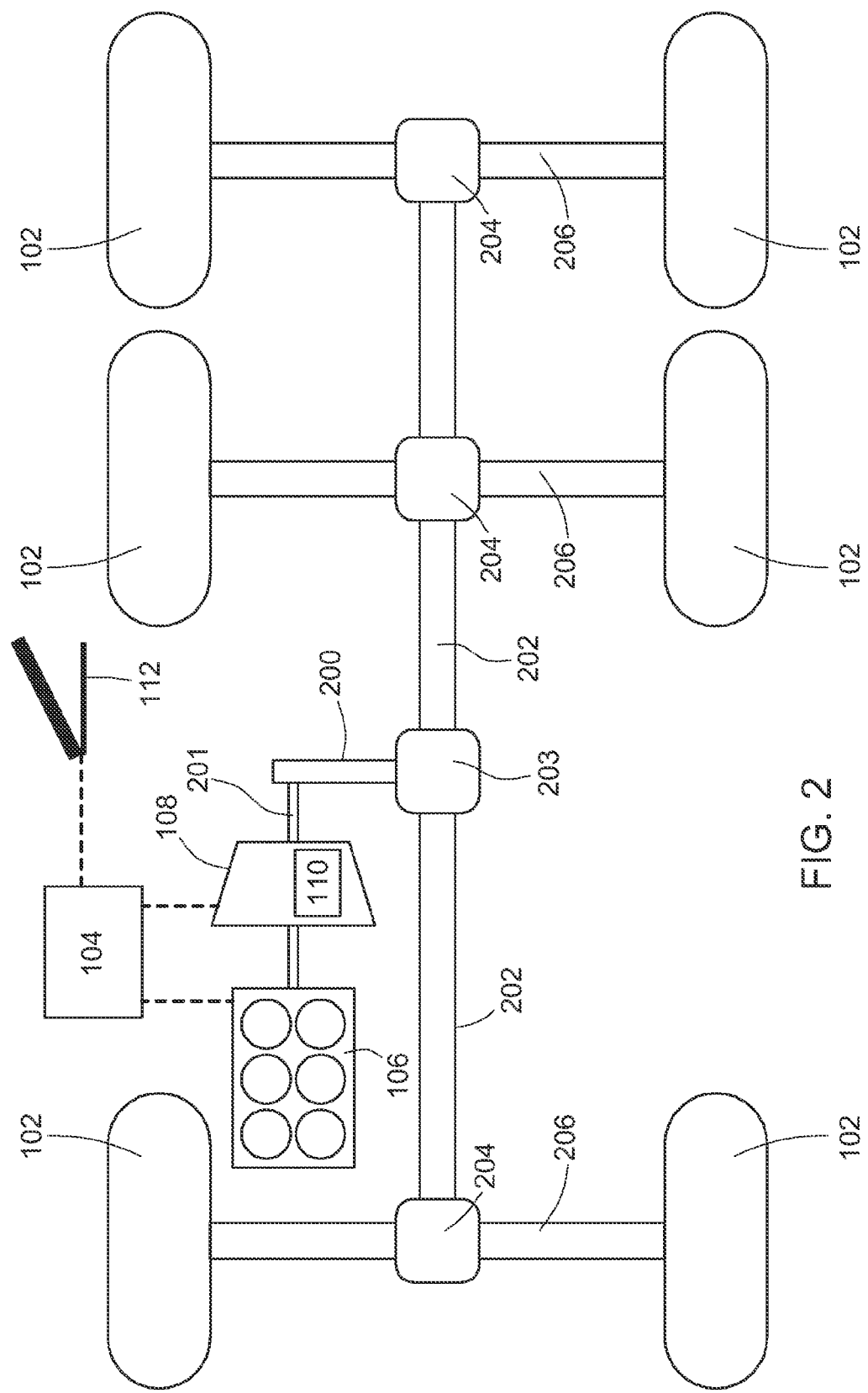
FIG. 2 is a schematic of a vehicle powertrain.

FIG. 2 is a schematic generally illustrating the powertrain layout of vehicle 100, comprising wheels 102, controller 104, engine 106, transmission 108, retarder 110, accelerator pedal 112, dropbox 200, dropbox shaft 201, driveshaft 202, driveshaft differential 203, differentials 204, and axles 206. The layout in FIG. 2 depicts six wheels, but the present disclosure may also be applied to a vehicle with a different number of wheels, such as four. Engine 106 is operatively coupled to transmission 108, which in turn is operatively coupled to dropbox 200 through dropbox shaft 201. Dropbox 200 may be a gearbox designed to transfer mechanical power from transmission 108 down to driveshaft 202, and in certain embodiments may be integral to transmission 108. Dropbox 200 is operatively coupled to driveshaft 202 through driveshaft differential 203, and driveshaft 202 in turn is operatively coupled to differentials 204, axles 206, and wheels 102. Controller 104 is in electrical communication with engine 106, transmission 108 (and retarder 110 integrated therein), and accelerator pedal 112. Controller 104 may sense the position of accelerator pedal 112 and issue commands to engine 106, transmission 108, and retarder 110 based on the position of accelerator pedal 112.

Figure 3:
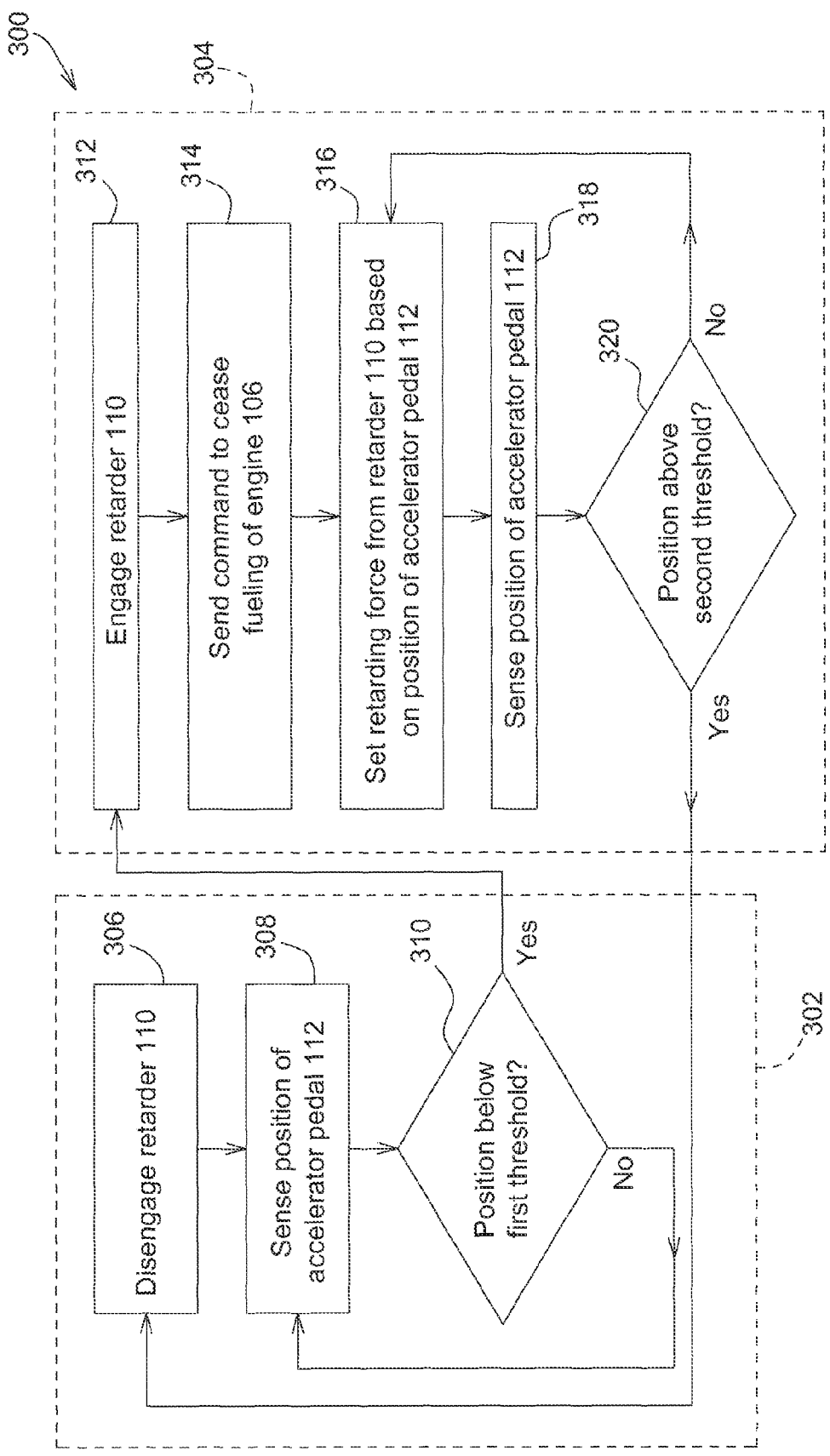
FIG. 3 is a flow diagram for a vehicle speed control system.

FIG. 3 is a flow diagram of control system 300 for controlling the speed of vehicle 100 which controller 104 may be configured to execute, comprising first mode 302, second mode 304, and steps 306-320. Although control system 300 is illustrated as a flowchart, the disclosure is not limited to such steps and the order of steps as presented, and it would be well within the skill of one of ordinary skill in the art to reorder, combine, or split many of the steps and achieve the same result. Further, although control system 300 is divided into steps executed within first mode 302 (i.e., steps 306-310) and steps executed within second mode 304 (i.e., steps 312-320), this organization is just one embodiment of the present disclosure and alternate embodiments may have additional modes, certain steps executed in the opposite mode, certain steps executed outside of either mode, or certain steps not executed at all (e.g., step 314).

Control system 300 may be initialized at a number of different steps upon the startup of vehicle 100, but for purposes of this description control system 300 will be initialized at step 306 in first mode 302. In step 306, retarder 110 is disengaged so that it does not exert hydraulic drag on the drivetrain of vehicle 100, except for incidental losses such as those caused by windage. In step 308 (and step 318), the position of accelerator pedal 112 is sensed. Depending on the design of accelerator pedal 112, this position may be sensed by an angular position sensor or a linear position sensor attached to accelerator pedal 112 or attached to associated mechanical components which move in a known relationship to accelerator pedal 112. Such a sensor may output a signal sensed by controller 104, or electrically communicated to controller 104 through intermediate components. The signal from the sensor may be converted, for example to a range from 0% (corresponding to accelerator pedal 112 in the neutral, non-depressed position) to 100% (corresponding to accelerator pedal 112 in the fully depressed position). In alternative embodiments, accelerator pedal 112 may be replaced by other operator inputs such as a lever or a knob, and the position of these may be sensed in a similar manner to accelerator pedal 112. In yet other alternative embodiments, sensing the position of accelerator pedal 112 may be replaced in step 308 and step 318 with sensing a vehicle propel command (e.g., a target vehicle acceleration, vehicle deceleration, vehicle speed, engine speed, engine torque, powertrain torque, or rimpull), and the remaining references to the position of accelerator pedal 112 in control system 300 may be replaced with references to the vehicle propel command. Such alternative embodiments may be desirable where other components, controllers, or control systems manage vehicle speed (e.g., cruise control, speed limiters, limited slip traction control, GPS guided driving). For example, if vehicle 100 had the capability to autonomously or semi-autonomously drive a route based on GPS signals indicating the position of vehicle 100 on the route, control system 300 may receive vehicle propel commands from such an autonomous control system or be integrated into such a control system to control the functioning of retarder 110.

The position of accelerator pedal 112 may be used by other control systems to control, for example, engine 106 and transmission 108. If control system 300 is in first mode 302, retarder 110 is disengaged and other control systems may control the movement of vehicle 100 based on the position of accelerator pedal 112. There are multiple methods by which the position of accelerator pedal 112 may be used to control the movement of vehicle 100, including by mapping it to an acceleration or speed for vehicle 100 (e.g., 50% actuation of accelerator pedal 112 corresponds to a target of 50% of maximum acceleration of vehicle 100), mapping it to an engine speed or engine torque (e.g., 10% actuation of accelerator pedal 112 corresponds to 10% of maximum torque for engine 106), or mapping it to a powertrain torque or rimpull (e.g., 20% actuation of accelerator pedal 112 corresponds to a target rimpull of 30 kN). Vehicle 100 may then be controlled based on such targets, but vehicle 100 need not achieve the exact targets. For example, in some embodiments a target speed for engine 106 may be based on the position of accelerator pedal 112, but the actual speed of engine 106 achieved will depend on the load placed on engine 106. The greater the load placed on engine 106, the more its actual speed may fall below the target speed.

In step 310, the position of accelerator pedal 112 (or, in alternative embodiments, the vehicle propel command) is compared to a first threshold to determine if the position of accelerator pedal 112 is below the first threshold. The value of the first threshold may be set in a number of different manners. In the embodiment depicted in FIGS. 3-4, the first threshold may be set by the vehicle manufacturer at the time of manufacture. In an alternative embodiment, the first threshold may be set by the vehicle manufacturer but modifiable by the vehicle owner. In yet another alternative embodiment, the first threshold may be dynamically calculated based on the speed, acceleration, and front-rear angle of vehicle 100 (i.e., the grade in the direction of travel for vehicle 100), or other factors. In this example, the first threshold is set to a very low value such as 1% so that step 310 results in a "yes" outcome when accelerator pedal 112 is in the neutral non-depressed position or very close to that position, and results in a "no" outcome otherwise.

If the position of accelerator pedal 112 is not below the first threshold, control system 300 remains in first mode 302 and returns to step 308. This creates a loop where retarder 110 remains disengaged while the position of accelerator pedal 112 is repeatedly sensed and compared to the first threshold. Control system 300 remains in this loop, and retarder 110 remains disengaged, until the position of accelerator pedal 112 is below the first threshold, at which time control system 300 continues to step 312.

In step 312, retarder 110 is engaged. In certain embodiments, retarder 110 may be engaged through a command signal electrically communicated by controller 104 to a transmission control unit (TCU), with the TCU in turn sending out electrical signals to a certain solenoid or solenoids that results in the engagement of retarder 110. Controller 104 may communicate with the TCU, other controllers, sensors, and solenoids through direct component-to-component connections, or instead such components may each be connected to a Controller Area Network (CAN) which facilitates such communications. Once retarder 110 is engaged, hydraulic drag is generated which resists the rotation of certain components of the powertrain of vehicle 100. Specifically, the hydraulic drag of retarder 110 resists the rotation of transmission 108, which is operatively coupled to driveshaft 202 and wheels 102 through dropbox 200. This acts to slow the rotational speed of components operatively coupled to the output of transmission 108 (i.e., provide a negative torque to transmission 108), including wheels 102, and thereby provides a retarding force which slows the speed of vehicle 100. In alternative embodiments, retarder 110 may exert a retarding force through effects other than hydraulic drag, such as when retarder 110 is an engine brake retarder, exhaust brake retarder, or electric retarder (e.g., an eddy current retarder). Controller 104 may modify the amount of retarding force exerted by retarder 110 by modifying the amount of hydraulic drag exerted by retarder 110 through commands electrically communicated to retarder 110 through the TCU.

Step 314 may be desirable for certain embodiments of the present disclosure, or for certain applications of an embodiment of the present disclosure, but not others. In step 314, control system 300 sends a command to cease fueling of engine 106. In this context, ceasing fueling involves reducing the fuel combusted by engine 106 to the minimum amount possible, which may be zero for certain embodiments. This serves multiple purposes. It reduces fuel consumption of vehicle 100, both by preventing engine 106 from generating unnecessary torque and by allowing any load on engine 106 (such as loads from hydraulic pumps or alternators) to be driven externally by the rotation of wheels 102 back-driving the powertrain of vehicle 100, as engine 106 remains coupled to wheels 102. It also reduces torque generated by engine 106 tending to oppose the retarding force exerted by retarder 110, thereby allowing retarder 110 to control the speed of vehicle 100 more effectively. In alternative embodiments, engine 106 may be disengaged from wheels 102, such as by a clutch integrated into transmission 108, and commanded to idle to reduce fuel consumption and decouple the rotational speed of engine 106 and the remainder of the powertrain of vehicle 100. As used herein, "idle" does not mean only the lowest standby engine speed attainable by engine 106, but may include other engine speeds or modes such as a high idle or an economy mode that minimizes fuel consumption.

The command to cease fueling of engine 106 may be sent to another control system which controller 104 has been configured to execute, or another controller such as an Engine Control Unit (ECU). The other control system or controller (e.g., ECU) may cease fueling engine 106 by a number of mechanisms, such as via commands to fuel injectors or a fuel pump. In alternative embodiments, disengaging engine 106 from wheels 102 may be achieved through the disengagement of a clutch integrated into transmission 108. The command to cease fueling engine 106, or to disengage engine 106 from wheels 102 and idle it in alternative embodiments, need not be followed for the present disclosure to be operational, but instead may be disregarded if another control system or another controller is programmed to ignore or override these commands in certain circumstances. For example, a control system for the hydraulic functions of vehicle 100 may command a high engine speed for engine 106 to improve the performance of hydraulic pumps operatively coupled to engine 106, and such a command may override the command by control system 300 to cease fueling engine 106. In alternative embodiments, step 314 may be altered to merely send a notification that retarder 110 is being engaged to another controller, such as an ECU, and that controller may execute its own control system that determines when to cease fueling engine 106, rather than placing such steps and the associated commands into control system 300. In the embodiment illustrated in FIG. 3, there is no command to resume fueling engine 106, but instead another controller, such as an ECU, determines when it is appropriate to resume fueling.

Figure 4:
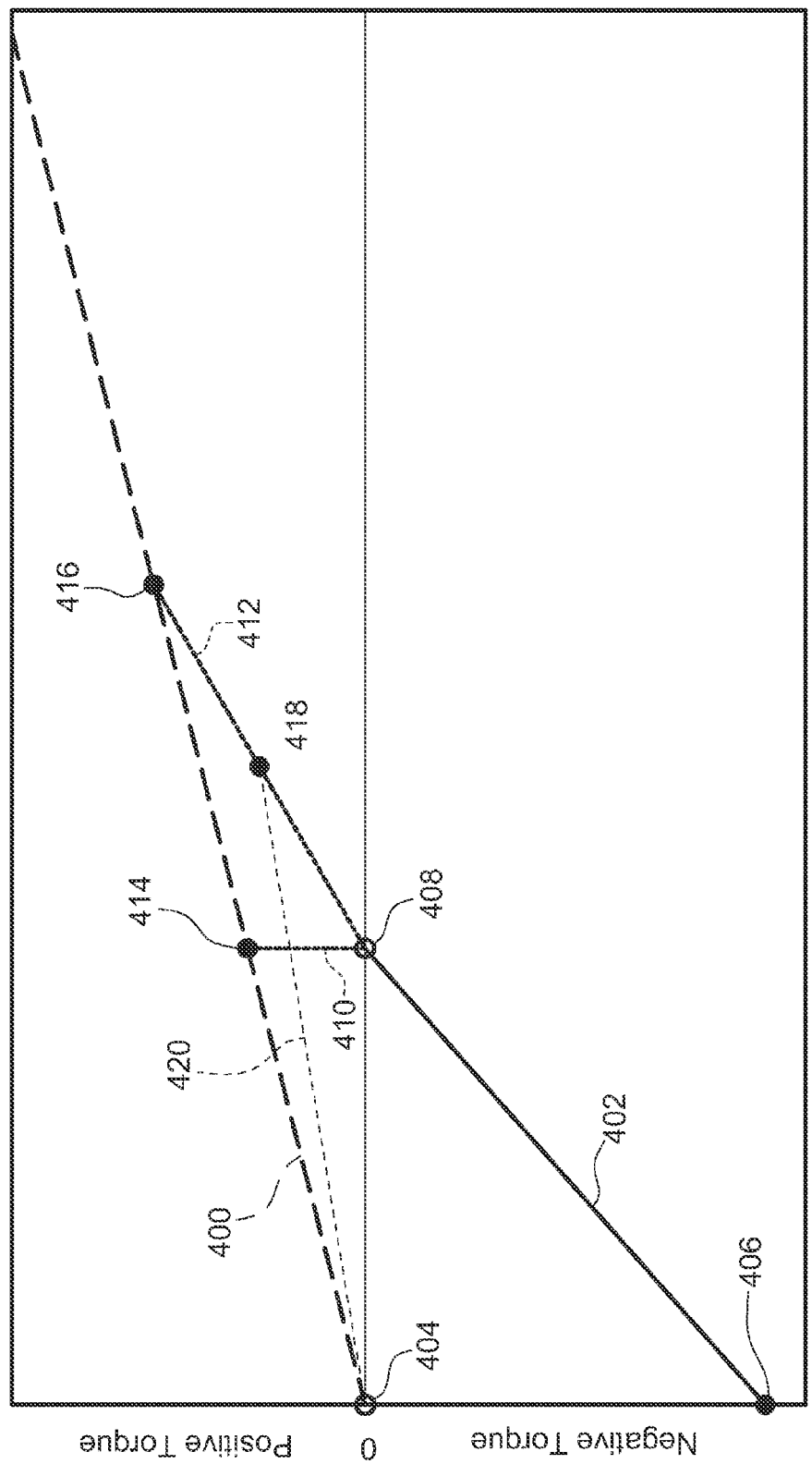
FIG. 4 is a graph illustrating characteristics of a vehicle powertrain.

In step 316, the retarding force resulting from retarder 110 is set based on the position of accelerator pedal 112. The relationship between the retarding force exerted by retarder 110 and the position of accelerator pedal 112 is illustrated in FIG. 4, and further described below, for one embodiment. In that embodiment, the retarding force from retarder 110 is reduced as accelerator pedal 112 is depressed, permitting the usage of accelerator pedal 112 to reduce the retarding force without disengaging retarder 110. This may allow accelerator pedal 112 to be used to maintain a steady vehicle speed if vehicle 100 is descending a grade but slowing due to the retarding force of retarder 110.

In step 318, the position of accelerator pedal 112 is sensed as it is in step 308. In step 320, the position of accelerator pedal 112 is compared to a second threshold. If the position is above the second threshold, step 306 is performed next. If the position is not above the second threshold, step 316 is performed next and control system 300 effectively enters a loop. In the loop consisting of step 316, step 318, and step 320, control system 300 repeatedly checks the position of accelerator pedal 112, determines it is not above the second threshold, and sets the retarding force from retarder 110 based on the position. This loop allows retarder 110 to be controlled through actuation of accelerator pedal 112, enabling a reduction in retarding force if vehicle 100 is slowing more rapidly than desired, a situation which may occur, for example, if vehicle 100 is traveling down a shallow descent.

Control system 300 may be implemented as a feature which is active whenever vehicle 100 is operating, selectively activatable such as through an operator-actuable switch, or automatically activated or deactivated based on the gear selector (e.g., a Forward-Neutral-Reverse, or FNR, selector), vehicle speed, or a combination of those or other factors. For example, when vehicle 100 is stopped or is traveling below a minimum speed, control system 300 may be suspended to avoid unnecessary cycling of retarder 110 and leave it in either an engaged or disengaged state. As yet another example, control system 300 may be activated only upon detecting that vehicle 100 has exceeded a certain speed and is deactivated only upon the vehicle stopping. Vehicle 100 may also comprise a powertrain status operator notification system, such as an icon or other visual cue for the operator in operator cab 111. Such an icon may display the torque exerted on transmission 108 (including the torque from engine 106 and the torque exerted by retarder 110) by, for example, a green bar or series of lights whose length represents the amount of positive torque and a red bar or series of lights whose lengths represents the amount of negative torque.

FIG. 4 illustrates the target torque to transmission 108 (i.e., the torque from engine 106 and torque from retarder 110) based on the position of accelerator pedal 112 when control system 300 is active. Line 400 generally illustrates the steady-state target torque as a function of the position of accelerator pedal 112, which would occur in first mode 302 of control system 300. In this embodiment, the torque increases proportionally with the actuation of accelerator pedal 112, ranging from essentially zero torque when accelerator pedal 112 is near a neutral non-depressed position to the maximum torque of engine 106 when accelerator pedal 112 is fully depressed. Line 402 illustrates the retarding torque resulting from the engagement of retarder 110 which would occur in second mode 304 of control system 300.

In the embodiment illustrated in FIG. 4, line 400 begins at point 404 which corresponds to a position of accelerator pedal 112 just at or above the first threshold. If control system 300 is currently in first mode 302, it will stay in that mode as accelerator pedal 112 is actuated from its position at point 404, to point 414, to point 416, and beyond, because it will not fall below the first threshold and trigger a transition to second mode 304 in step 310 of control system 300. The corresponding target torques for these positions of accelerator pedal 112 are shown along dashed line 400 connecting point 404, point 414, and point 416, and continuing beyond those points.

If the position of accelerator pedal 112 falls below the position corresponding to point 404, which corresponds to the first threshold in step 310, step 310 will trigger a transition of control system 300 from first mode 302 to second mode 304. The target torque will also transition, from minimum torque (which may be zero) at point 404 to the default retarding torque from retarder 110. The default retarding torque corresponding to point 406 may be set to a default by the manufacturer of vehicle 100, but it may also be altered by the operator, such as through a setting modifiable by the operator through a series of on-screen prompts on a display of vehicle 100 or through a operator switch such as a button, knob, or lever.

Multiple manufacturers currently control vehicle speed through retarders which automatically engage when an accelerator pedal is in a neutral position and exert a retarding torque equal to a default setting which is operator-modifiable, and then disengage upon the accelerator pedal being actuated. Such automatically engaging retardation systems aid in encouraging the usage of a retarder instead of service brakes by removing the need for the operator to undertake an additional step, such as actuating a retarder pedal or retarder lever, to activate the retarder. If the default retarding torque is not properly matched to the vehicle's current descent (i.e., not properly set by the operator), the default retarding torque may be too great and the vehicle may slow more than desired. To combat this effect, the operator may cycle the retarder on and off by repeated shallow actuations of the accelerator, allowing the vehicle to maintain a higher speed then it would if the retarder were engaged continuously. Such cycling may wear the retarder and other drivetrain components. Such cycling also creates discontinuities in the acceleration of the vehicle, as the retarding force is applied and removed in a step-wise fashion, and such discontinuities may be uncomfortable for the operator, may subject the components of the vehicle to transient forces, and may cause shifting in the payload of the vehicle. For example, in the embodiment schematically illustrated in FIG. 2, components within retarder 110, transmission 108, dropbox 200, driveshaft 202, differentials 204, axles 206, and wheels 102 may experience wear as a result of transient forces and sudden torque changes caused by the cycling of retarder 110.

While vehicle 100 may experience a discontinuity in transitioning from the rimpull at point 404 to the rimpull at point 406, second mode 304 of control system 300 allows the operator to control the speed of vehicle 100 through the actuation of accelerator pedal 112 without disengaging retarder 110. If the retarding force corresponding to point 406 is greater than desired by the operator, the operator may actuate accelerator pedal 112 to achieve a lesser retarding force along line 402 until reaching point 408, which corresponds to the second threshold, at which point retarder 110 is providing its minimum retarding force. If accelerator pedal 112 is actuated to a position beyond the second threshold (i.e., beyond point 408), step 320 will transition control system from second mode 304 to first mode 302, retarder 110 will disengage, and fueling of engine 106 may resume to generate the target torque along line 400. Multiple techniques may be used to smooth this transition, two of which are shown with line 410 and line 412. Line 410 illustrates a first technique, which is to immediately generate the requested torque according to the torque-accelerator pedal 112 position relationship defined by line 400 upon leaving second mode 304, for example, generating the torque corresponding to point 414 (which corresponds to the position of accelerator pedal 112 just above the second threshold) immediately upon leaving second mode 304. Line 412 illustrates a second technique, which is to ramp up the torque generated by vehicle 100 upon leaving second mode 304 according to the torque-accelerator pedal 112 position relationship defined by line 412 until it equals the requested torque according to line 400 at the accelerator pedal 112 positioned corresponding to point 416. For example, the torque may gradually ramp up along line 412 in response to continued depression of accelerator pedal 112 until reaching point 416, and then proceed up or down line 400 from point 416 pursuant to changes in the position of accelerator pedal 112. Should the accelerator pedal 112 be moved towards the neutral non-depressed position while vehicle 100 is generating torque according to the torque-accelerator pedal 112 position relationship defined by line 412, torque may be varied in a few different ways. In the embodiment illustrated in FIG. 4, if the position of accelerator pedal 112 is increased until point 418 is reached, but then reduced, torque may be reduced proportionally such that it will reach zero when the position of accelerator pedal 112 reaches zero, as shown by line 420. If accelerator pedal 112 is depressed again during this time, torque may rise with the slope of line 412 until it reaches the torque-accelerator pedal 112 relationship defined by line 400. In short, the transition may be achieved by increasing torque according to the slope of line 412, but decreasing torque by the slope of a line through the current torque-accelerator pedal 112 position and point 404. In alternative embodiments, torque may be reduced with accelerator pedal 112 position according to the slope of line 400 (but not falling below zero), and increased with accelerator pedal 112 position according to the slope of line 412 until torque reaches a point on line 400. In these alternative embodiments, the relationship between torque and the position of accelerator pedal 112 as control system 300 transitions from second mode 304 to first mode 302 may resemble a saw-tooth pattern bounded by the triangle formed by lines between point 404, point 408, and point 416. As yet another alternative to line 410 and line 412, vehicle 100 may transition out of second mode 304 into generating torque according to the relationship defined by line 400 on a time-based schedule, which will tend to reduce discontinuities in torque. In one embodiment of such an alternative, torque gradually increases from point 408, where control system 300 leaves second mode 304, to a point on line 400 over a period of two seconds.

To further smooth the forces which vehicle 100 experiences when retarder 110 is engaged and disengaged, and reduce discontinuities in torque, the retarding force exerted by retarder 110 may be ramped up and ramped down. Upon a command to engage retarder 110, retarder 110 may be engaged with its minimum retarding force and then the retarding force may be increased until it reaches the target retarding force. Similarly, upon a command to disengage retarder 110, the retarding force exerted by retarder 110 may be decreased from its current level until it reaches its minimum, at which time retarder 110 may be disengaged.

While retarder 110 is engaged, the retarding force it exerts is determined based on the position of accelerator pedal 112 but it may also be based on other factors such as the grade vehicle 100 is traversing, the speed of vehicle 100, or the position of vehicle 100 on a route (e.g., speed limits, autonomous or semi-autonomous operation). For example, the retarding force may increase if vehicle 100 is descending a steep grade or decrease if vehicle 100 is descending a shallow grade. The embodiment depicted in FIG. 4 illustrates the relationship of torque and position of accelerator pedal 112 assuming no change in any other factors which may be taken into consideration when setting the retarding force of retarder 110.

The first and second thresholds for the position of accelerator pedal 112 (i.e., the position corresponding to points 404/406 and 408/414) may be set to a fixed value by the manufacturer of vehicle 100, they may be made modifiable by the operator of vehicle 100, or they may be dynamically set based on the conditions being experienced by vehicle 100, and these thresholds may be set to a number of different values. Setting the value of the first threshold may require the balancing of counteracting factors, such as a desire to set it to a very low value to avoid the accidental engagement of second mode 304 and a desire to set it to a high enough value to avoid difficulties engaging second mode 304 due to inaccurate readings by the sensor measuring the position of accelerator pedal 112. Setting the value of the second threshold may also require a balancing of factors, such as the desire to provide a sufficiently broad actuation range to enable the operator to modify the retarding force of retarder 110 as needed without accidentally disengaging retarder 110 by exceeding the second threshold. Dynamically setting the values of the first threshold and second threshold may mitigate some of the tradeoffs made, but may introduce complexity into control system 300. The first and second thresholds may be dynamically set to lower values based on the grade on which vehicle 100 is traveling to discourage the engagement of retarder 110 in situations where its usage seems less likely, such as when vehicle 100 is traveling uphill. The second threshold may be set to a higher value based on the speed of vehicle 100 and the grade on which it is traveling where fine adjustments to the retarding force seem likely to be necessary, such as when vehicle 100 is traveling down a moderate or shallow slope where only a light retarding force is necessary. Other modifications to control system 300 may improve the operator's control of retarder 110, including filtering the sensor signals for the position of accelerator pedal 112 or requiring a sensed position below the first threshold or above the second threshold for a period of time before transitioning between first mode 302 and second mode 304. Such modifications may reduce the effect of errant sensor signals or undesired movement of accelerator pedal 112 (such as may happen if vehicle 100 is pitching and causes the operator's foot to move) on the performance of retarder 110.

As used herein, "based on" means "based at least in part on" and does not mean "based solely on," such that it neither excludes nor requires additional factors.

While the disclosure has been illustrated and described in detail in the drawings and foregoing description, such illustration and description is not restrictive in character, it being understood that illustrative embodiment(s) have been shown and described and that all changes and modifications that come within the spirit of the disclosure are desired to be protected. Alternative embodiments of the present disclosure may not include all of the features described yet still benefit from at least some of the advantages of such features. Those of ordinary skill in the art may devise their own implementations that incorporate one or more of the features of the present disclosure and fall within the spirit and scope of the appended claims.

What is claimed is:

1. A method for controlling the speed of a vehicle comprising:
sensing, via an electronic controller and a sensor, a position of an operator input;
determining, via the controller and the sensor, whether the position of the operator input is above or below a first threshold;
engaging, via the controller and the sensor, a retarder only upon the position of the operator input falling below a first threshold;
modifying, via the controller and the sensor, a retarding force exerted by the retarder based on the position of the operator input while the retarder is engaged and the position of the operator input is below a second threshold above the first threshold; and
disengaging, via the controller and the sensor, the retarder upon the position of the operator input rising above the second threshold.

2. The method of claim 1, wherein the operator input is a movable pedal.

3. The method of claim 1, further comprising modifying an output torque of an engine based on the position while the retarder is disengaged.

4. The method of claim 1, further comprising modifying a vehicle propel command based on the position while the retarder is disengaged, wherein the vehicle propel command comprises a target vehicle acceleration, vehicle speed, engine speed, engine torque, powertrain torque, or rimpull.

5. The method of claim 1, further comprising ceasing fueling of an engine while the retarder is engaged.

6. The method of claim 1, further comprising disengaging an engine from at least one wheel supporting the vehicle on a ground surface and idling the engine while the retarder is engaged.

7. A vehicle comprising:
an engine;
a retarder;
an operator input;
a sensor sensing a position of the operator input; and
an electronic controller configured to receive position input from the sensor and command engagement of the retarder only upon a position of the operator input falling below a first threshold, command disengagement of the retarder upon the position of the operator input rising above a second threshold above the first threshold, and command a modification of a retarding force exerted by the retarder based on the position of the operator input while the retarder is engaged.

8. The vehicle of claim 7, wherein the operator input is a movable pedal.

9. The vehicle of claim 7, further comprising a wheel supporting the vehicle on a ground surface, wherein the controller is further configured to command disengagement of the engine from the wheel and command the engine to an idle while the retarder is engaged.

10. The vehicle of claim 7, wherein the controller is further configured to command that the fueling of the engine cease while the retarder is engaged.

11. The vehicle of claim 7, wherein the controller is further configured to control a torque of the engine based on the position while the retarder is disengaged.

12. The vehicle of claim 11, wherein the controller is further configured to command that the fueling of the engine cease while the retarder is engaged.

13. The vehicle of claim 11, further comprising a wheel supporting the vehicle on a ground surface, wherein the controller is further configured to disengage the engine from the wheel while the retarder is engaged.

14. The vehicle of claim 7, wherein the retarder is a hydraulic retarder.

15. The vehicle of claim 14, wherein the retarder is included in a multi-speed transmission.

16. A method for controlling the speed of a vehicle comprising:
sensing a vehicle propel command via a sensor;
entering a first mode only upon an electronic controller receiving input from the sensor of the vehicle propel command falling below a first threshold;
engaging, via the controller, a retarder while in the first mode;
modifying, via the controller, a retarding force exerted by the retarder based on the vehicle propel command while in the first mode;
entering, via the controller, a second mode upon the vehicle propel command rising above a second threshold above the first threshold;
disengaging, via the controller, the retarder while in the second mode;
commanding, via the controller, a target based on the vehicle propel command while in the second mode; and
adjusting, via the controller, the target while in the second mode.

17. The method of claim 16, further comprising ceasing the fueling of an engine while in the first mode.

18. The method of claim 16, wherein the target comprises at least one of a target vehicle acceleration, vehicle speed, engine speed, engine torque, powertrain torque, and rim pull.

19. The method of claim 16, wherein the target is adjusted based on the time elapsed since the second mode was last entered.

20. The method of claim 16, wherein the target is adjusted based on the vehicle propel command beginning upon entering the second mode and ending upon the vehicle propel command rising above a third threshold.

* * * * *